Patented Feb. 15, 1949

2,461,661

UNITED STATES PATENT OFFICE 2,461,661

PREPARATION OF ALKALI METAL COMPOUNDS

Hermann I. Schlesinger, Chicago, Ill., and Herbert C. Brown, Detroit, Mich., assignors to the United States of America as represented by the United States Atomic Energy Commission No Drawing. Application January 9, 1945, Serial No. 572,090

11 Claims. (Cl. 23—204)

The invention relates to the borohydrides of the alkali metals and to a method of preparing the same.

It is an object of the invention to provide alkali metal borohydrides and, more particularly, to provide sodium borohydride, $NaBH_4$. It is a further object of the invention to provide a convenient and efficient method of preparing alkali metal borohydrides. A more specific object of the invention is the provision of a process in which an alkali metal alkoxyborohydride is reacted with a boron hydride to form an alkali metal borohydride. Further objects and advantages will be apparent from the following description.

In accordance with the present invention it has been found that an alkali metal borohydride such as sodium borohydride may be obtained from the reaction of an alkali metal alkoxyborohydride and diborane, $B_2H_6$. The reaction between the alkali metal alkoxyborohydride and the diborane probably proceeds in accordance with the following equation:

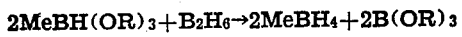

$$2MeBH(OR)_3 + B_2H_6 \rightarrow 2MeBH_4 + 2B(OR)_3$$

in which Me indicates any alkali metal and R indicates any monovalent radical derived from a monovalent alcohol (ROH).

In forming the alkali metal borohydride, an alkali metal alkoxyborohydride is placed in a reaction vessel and diborane is brought into contact with the alkali metal alkoxyborohydride for a suitable time and at a suitable temperature. The reaction usually proceeds at a temperature below room temperature. However, some heat may be required particularly when the higher alkoxyborohydrides are used and not infrequently the temperature of reaction is maintained up to 50° C. or even higher. In most cases the greater the pressure under which diborane is present in the reaction vessel, the more rapidly the reaction will proceed. If desired, a quantity of diborane sufficient to convert all of the alkali metal alkoxyborohydride to the corresponding alkali metal borohydride may be introduced into the reaction vessel and into contact with the alkali metal alkoxyborohydride by means of a closed system, the diborane then remaining in contact with the alkali metal alkoxyborohydride until the reaction is complete. Alternatively the diborane may be passed through or over a porous mass of the alkoxyborohydride.

Diborane may be prepared by the reaction of an alkali metal hydride and a boron halide in the presence of an ether such as, for example, diethyl ether. A suitable example of this method is described in our copending application Serial No. 576,502 filed February 6, 1945.

The alkali metal alkoxyborohydride, used in preparing the desired alkali metal borohydride, may be obtained by the reaction of an alkali metal hydride and an ester of boric acid and a monohydric alcohol. These alkali metal alkoxyborohydrides and their methods of preparation are more fully described and claimed in our copending application, Serial No. 605,618, filed July 17, 1945. In preparing the alkali metal alkoxyborohydride, hydrides of any of the alkali metals such as lithium, sodium or potassium hydrides may be used.

The alkyl borates are generally indicated by the formula $B(OR)_3$ in which R is monovalent group derived from a monohydric alcohol such as methyl, ethyl, propyl, butyl, isobutyl, allyl, methallyl, propargyl, hexyl, oleyl, stearyl, or the like. Common alkyl borates are methyl borate, $B(OCH_3)_3$, ethyl borate, $B(OC_2H_5)_3$, and propyl borate, $B(OC_3H_7)_3$. Methyl borate, ethyl borate, and propyl borate are colorless liquids having the approximate boiling points of 65° C., 120° C., and 175° C., respectively. While other alkyl borates may be utilized for the preparation of the alkali metal alkoxyborohydride, in view of the availability of the alkyl borates containing lower members of the alkyl series, it is preferred that these available compounds be used in the reaction.

In the reaction yielding the alkali metal alkoxyborohydride, the alkali metal hydride and alkyl borate form an addition compound and the reaction probably proceeds according to the following equation:

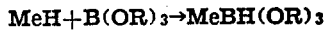

$$MeH + B(OR)_3 \rightarrow MeBH(OR)_3$$

in which Me indicates any alkali metal and R indicates any alkyl group.

As a specific example of the preparation of the alkali metal alkoxyborohydride, 480 grams of sodium hydride were placed in a 12 liter, round-bottom flask previously flushed with dry nitrogen, an efficient, high capacity reflux condenser being connected to the flask. To prevent flooding, the condenser was constructed with an inner tube of 25 millimeters diameter. Through the top of the condenser was added 2300 grams of methyl borate in portions of from 200 grams to 300 grams each. After all of the methyl borate was added, the temperature of the flask and contents was raised slowly to the boiling point of methyl borate (68° C.). The methyl borate was maintained at a gentle reflux from five to six hours. During the refluxing, the sodium hydride slowly absorbed the methyl borate and the volume of the reaction mixture increased to approximately five times the original volume, the color of the sodium hydride changing from gray to pure white. When there was no further absorption of the methyl borate by the sodium hydride, the reflux condenser was changed to a downward condenser and the excess methyl borate was distilled off. The last trace of the methyl borate was removed under reduced pressure. The yield from the above reaction was approximately 650 grams of sodium trimethoxyborohydride.

The sodium trimethoxyborohydride is a white crystalline solid, stable in dry air, and slowly affected by moist air. The compound has a melting point of approximately 230° C.

As a general example of the preparation of the alkali metal borohydride, an alkali metal alkoxyborohydride and diborane are reacted in a closed system essentially free from air. Closed reactors—equipped with agitators and provided with adequate distillation equipment and vacuum pumps—are suitable.

In conducting the process the alkali metal alkoxyborohydride may be placed in the reactor, the reactor closed and air substantially completely removed by suitable means such as by evacuation or by flushing with an inert gas such as nitrogen. This removal of air is required in order to avoid contact of air with diborane.

Thereafter diborane usually in gaseous state is delivered to the reactor and the reaction permitted to occur. This reaction normally takes place at room temperature although the reaction will proceed at temperatures as low as —80° C. and, if desired, may be conducted at an elevated temperature, for example, 50° C. or above. After the reaction is over, alkyl borates and other volatile impurities are distilled off and the alkali metal borohydride recovered.

The following specific examples illustrate the process embodying the invention for the preparation of sodium borohydride and lithium borohydride.

*Example I.*—Sodium trimethoxyborohydride in the amount of 0.1460 gram was placed in the reactor and the reactor was connected to a closed gas bulb containing 42.2 cc. of gaseous diborane, referred to standard conditions, the diborane having been previously condensed to solid form in the gas bulb by means of liquid nitrogen. The reactor was evacuated to substantially completely remove air and the connection to the filled gas bulb was opened. The temperature of the gas bulb was permitted to rise to room temperature, thereby converting the solid diborane to gaseous diborane. The temperature of the reactor was lowered to approximately —196° C. by means of a cooling means containing liquid nitrogen. As the temperature of the reactor was lowered, the diborane contained in the gas bulb passed into the reactor. The cooling means surrounding the reactor was removed and the temperature of the reactor was permitted to rise to room temperature. The reaction began as the temperature of the reactor approached —80° C. and continued until the temperature of the reactor was approximately 25° C. After approximately 15 minutes from the time of removal of the cooling means from the reactor, the reaction was complete. After distillation of the methyl borate a yield of sodium borohydride approximately 80% of the theoretical yield was obtained.

*Example II.*—Lithium trimethoxyborohydride in the amount of 5 grams was placed in the reactor and the reactor was connected to a closed gas bulb containing 600 cc. of diborane, the diborane referred to standard conditions, having been previously condensed to solid form in the gas bulb by means of liquid nitrogen. After substantially completely exhausting the air from the reactor, the connection to the filled gas bulb was opened. The temperature of the gas bulb was permitted to rise to room temperature, thereby converting the solid diborane to gaseous diborane. The temperature of the reactor was lowered to approximately —196° C. by a cooling means containing liquid nitrogen. As the temperature of the reactor was lowered, the diborane contained in the gas bulb passed into the reactor. The cooling means surrounding the reactor was then removed and the temperature of the reactor was permitted to rise to room temperature. The reaction began as the temperature of the reactor approached —80° C. and continued until the temperature of the reactor was approximately 25° C. After distillation of the methyl borate a yield of lithium borohydride of approximately 85% of the theoretical yield was obtained.

After being formed by the reaction of diborane and the alkali metal alkoxyborohydride, the alkali metal borohydride may be further treated for the purpose of purification. Alkyl borates formed during the reaction may be separated from the alkali metal borohydride by raising the temperature of the reactor to between 100° C. to 200° C. by any suitable heating means, thereby distilling off the alkyl borates. Further purification of the alkali metal borohydride may be effected by dissolving the alkali metal borohydride in a solvent such as isopropylamine, filtering the solution, and crystallizing the alkali metal borohydride. This may be repeated until the desired purification has been obtained.

The sodium borohydride obtained from the process embodying the invention is a finely divided white powder. It is very soluble in liquid ammonia and pyridine; however, solvents such as diethyl ether, acetone, methyl borate, methyl cyanide, and trimethyl amine, do not dissolve sodium borohydride. A characteristic reaction of sodium borohydride is its hydrolysis with most acids including the mineral acids. Sodium borohydride reacts slowly with water at ordinary temperatures, hydrogen being released by the reaction, whereas lithium borohydride reacts much more violently in the presence of air. Furthermore, sodium borohydride is more stable than lithium borohydride and does not decompose at temperatures under 400° C. whereas lithium borohydride decomposes at about 275° C.

The borohydride of sodium is an excellent reducing agent. This compound may be used as reducing agent either in the form of a solution or as a solid.

A solution of the sodium borohydride for use as a reducing agent may be made by dissolving the dry compound in a suitable liquid such as, for example, water. Where the alkali metal borohydride is dissolved in water, it is preferred that the solution be used immediately as there is a tendency for the alkali metal borohydride to react with water. This reaction may be retarded by maintaining the solution at a low temperature such as, for example, at approximately 0° C.

Sodium borohydride is a satisfactory reducing agent for metals such as, for example, nickel, ruthenium, tellurium, and rhenium. In aqueous solution, the alkali metal borohydrides reduce silver, bismuth, mercury, arsenic, and antimony salts to the free metal. One characteristic reduction reaction of the alkali metal borohydrides is the reduction of nickel sulphate in solution to a black precipitate of nickel boride, $Ni_2B$. The reduction of nickel by alkali metal borohydride is similar to the reaction in which $Na_2B_2H_6O_2$ is employed as the reducing agent.

The above detailed description is for purposes of illustration and the invention is to be limited only by the scope of the following claims.

We claim:

1. A process of preparing an alkali metal borohydride which comprises reacting diborane and an alkali metal alkoxyborohydride.
2. A process of preparing an alkali metal borohydride which comprises reacting diborane and alkali metal trimethoxyborohydride.
3. A process of preparing sodium borohydride which comprises reacting diborane and sodium alkoxyborohydride.
4. A process of preparing sodium borohydride which comprises reacting diborane and sodium trimethoxyborohydride.
5. A process of preparing an alkali metal borohydride which comprises reacting diborane and an alkali metal alkoxyborohydride at a temperature below room temperature.
6. A process of preparing an alkali metal borohydride which comprises passing diborane into contact with alkali metal alkoxyborohydride at a temperature of between about $-80°$ C. and $50°$ C.
7. A process of preparing an alkali metal borohydride which comprises reacting diborane and an alkali metal alkoxyborohydride substantially in the absence of air.
8. A process of preparing an alkali metal borohydride which comprises introducing an alkali metal alkoxyborohydride into a reactor, substantially completely removing air from the reactor, and introducing diborane into the reactor and into contact with the alkali metal alkoxyborohydride, the temperature of the alkali metal alkoxyborohydride and diborane in the reactor being maintained between $-50°$ C. and $50°$ C.
9. A process of preparing an alkali metal borohydride which comprises introducing an alkali metal alkoxyborohydride into a reactor, substantially completely removing the air from the reactor, and introducing diborane into the reactor and into contact with the alkali metal alkoxyborohydride.
10. A process which comprises reacting an alkali metal trialkoxyborohydride with diborane.
11. Sodium borohydride, a white solid having the composition corresponding to the formula $NaBH_4$.

HERMANN I. SCHLESINGER.
HERBERT C. BROWN.

REFERENCES CITED

The following references are of record in the file of this patent:

"Chemical Reviews," vol. 31, Aug. 1942, article by Schlesinger et al., page 33.